United States Patent
Scannell (10) Patent No.: US 12,057,638 B2
(45) Date of Patent: Aug. 6, 2024

(54) ANTENNA AND METHOD OF MANUFACTURE THEREOF

(71) Applicant: Leonardo MW Ltd, Basildon (GB)

(72) Inventor: Brian Scannell, Basildon (GB)

(73) Assignee: LEONARDO UK LTD, London (GB)

( * ) Notice: Subject to any disclaimer, the term of this patent is extended or adjusted under 35 U.S.C. 154(b) by 478 days.

(21) Appl. No.: 16/343,602

(22) PCT Filed: Oct. 23, 2017

(86) PCT No.: PCT/EP2017/077032
§ 371 (c)(1),
(2) Date: Apr. 19, 2019

(87) PCT Pub. No.: WO2018/073456
PCT Pub. Date: Apr. 26, 2018

(65) Prior Publication Data
US 2020/0052409 A1  Feb. 13, 2020

(30) Foreign Application Priority Data

Oct. 21, 2016 (GB) .................................. 1617887

(51) Int. Cl.
*H01Q 15/24* (2006.01)
*H01Q 9/28* (2006.01)
(Continued)

(52) U.S. Cl.
CPC ............. *H01Q 15/244* (2013.01); *H01Q 9/28* (2013.01); *H01Q 13/0241* (2013.01); *H01Q 13/04* (2013.01)

(58) Field of Classification Search
CPC ...... H01Q 13/0241; H01Q 13/02; H01Q 9/28; H01Q 13/04; H01Q 15/24; H01Q 15/242; H01Q 15/244
See application file for complete search history.

(56) References Cited

U.S. PATENT DOCUMENTS

| 2,978,702 A | 4/1961 | Pakan |
| 3,656,166 A | 4/1972 | Klopach et al. |

(Continued)

FOREIGN PATENT DOCUMENTS

| CN | 202373690 U | 8/2012 |
| EP | 0507163 A2 | 10/1992 |

(Continued)

OTHER PUBLICATIONS

Andriambeloson, et al., "A 3D-printed PLA plastic conical antenna with conductive-paint coating for RFI measurements on MeerKAT site", 2015 IEEE-APS Topical Conference on Antennas and Propagation in Wireless Communications (APWC), Sep. 2015, pp. 945-948.

(Continued)

*Primary Examiner* — Tho G Phan
(74) *Attorney, Agent, or Firm* — Buchanan Ingersoll & Rooney PC (57) ABSTRACT

There is described a dielectric polariser for a bicone antenna. The polariser can include radiating vanes that are spaced circumferentially around an aperture of the bicone antenna. The vanes are orientated at 45° to the polarised waves propagated from the antenna in order to circularly polarise the linearly polarised waves. The polariser can be configured for manufacture using a 3D printing process. Surfaces of a central hub of the polariser can be metallised to provide the radiating surfaces of the antenna. This removes the need to use separate antenna elements. Alternative arrangements of 3D printed dielectric polariser are disclosed for use with antenna horns.

17 Claims, 10 Drawing Sheets

(51) Int. Cl.
*H01Q 13/02* (2006.01)
*H01Q 13/04* (2006.01)

(56) References Cited

U.S. PATENT DOCUMENTS

| | | | | |
|---|---|---|---|---|
| 3,829,863 | A * | 8/1974 | Lipsky | H01Q 9/28 |
| | | | | 343/773 |
| 4,568,943 | A | 2/1986 | Bowman | |
| 5,134,420 | A * | 7/1992 | Rosen | H01Q 13/04 |
| | | | | 343/756 |
| 5,767,814 | A | 6/1998 | Conroy et al. | |
| 5,793,330 | A | 8/1998 | Gans et al. | |
| 6,593,892 | B2 * | 7/2003 | Honda | H01Q 9/28 |
| | | | | 343/773 |
| 8,228,257 | B2 * | 7/2012 | Lalezari | H01Q 9/28 |
| | | | | 343/850 |
| 10,148,005 | B2 * | 12/2018 | Cohen | H01Q 17/008 |
| 2011/0304508 | A1 | 12/2011 | Remez et al. | |
| 2012/0188137 | A1 * | 7/2012 | Lalezari | H01Q 21/10 |
| | | | | 343/773 |
| 2012/0242553 | A1 | 9/2012 | Leung et al. | |
| 2014/0266977 | A1 | 9/2014 | Redd | |
| 2016/0248168 | A1 * | 8/2016 | Boyanov | H01Q 21/064 |

FOREIGN PATENT DOCUMENTS

| | | |
|---|---|---|
| EP | 2493019 A1 | 8/2012 |
| EP | 3182505 A1 | 6/2017 |

OTHER PUBLICATIONS

Bagheri-Korani, et al., "Wideband omnidirectional dual-polarized biconical antennas: A comparison of two approaches", Antennas and Propagation (EUCAP), Apr. 2013, pp. 1247-1251.

Deffenbaugh, et al., "Broadband Microwave Frequency Characterization of 3-D Printed Materials", IEEE Transactions on Components, Packaging and Manufacturing Technology, Dec. 2013, pp. 2147-2155, vol. 3, No. 12.

International Search Report (PCT/ISA/210) and Written Opinion (PCT/ISA/237) mailed on Jan. 23, 2018, by the European Patent Office as the International Searching Authority for International Application No. PCT/EP2017/077032.

Search Report mailed on Apr. 23, 2018, by the British Patent Office for Application No. 1717410.3.

Office Action issued on Nov. 11, 2021, by the Israeli Patent Office in corresponding Israeli Patent Application No. P-585732-IL. (4 pages).

* cited by examiner

ANTENNA AND METHOD OF MANUFACTURE THEREOF

In one aspect, the present invention relates to a polariser. In another it relates to an antenna that comprises a polariser. More specifically but not exclusively it relates to a 3D printed K-band microwave bicone antenna.

Large bicone antenna are known for use in direction finding. One known form of bicone antenna is described in U.S. Pat. No. 0,304,508 dated 2011 'Direction Finding Antenna System and Method' by Remez et al. The antenna disclosed uses four narrow band waveguides to feed a large bicone for use in direction finding. There are disadvantages to such antenna. For example, the antenna described is for use in direction finding; it is narrow band, it uses a large and bulky waveguide; it produces vertical polarization; it is expensive; and cannot be used in the present envisaged application.

Figure 1A:
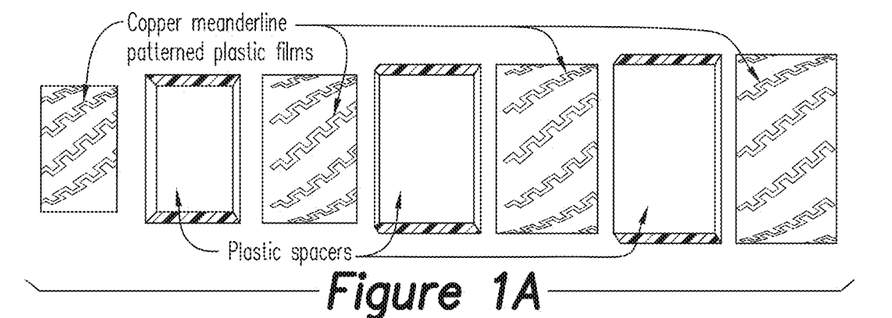
FIGS. 1A-1C show a cylindrical meanderline polariser in accordance with a known form of antenna.
Figure 1B:
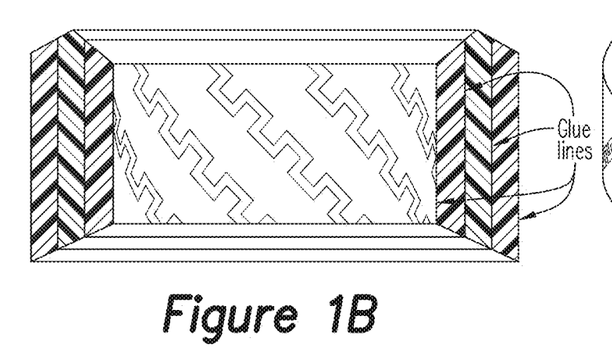
Figure 1C:
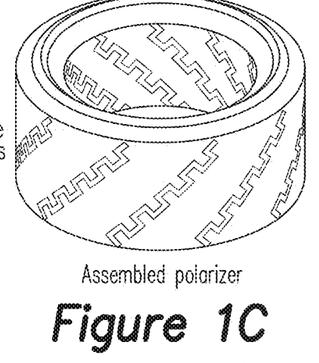

The standard method of producing circular polarisation for a bicone antenna is to use a meanderline polariser that comprises a series of cylinders in the bicone aperture which are interlaced with printed copper grids. This may be implemented using a four sandwich laminate of thin (35 micron) polyimide sheets which have the circuit patterns etched in copper on one side. An example of such a design is illustrated in FIG. 1. It has good performance but is expensive in terms of materials and assembly time.

The present invention aims to overcome these disadvantages and in one aspect to produce a K band antenna capable of optimally transmitting RF power in right hand polarisation at K Band.

According to a first aspect there is provided a polariser for arrangement about (e.g. in front of as viewed from outside the antenna) an antenna's physical aperture, the polariser comprising vanes that extend away from the antenna, the vanes oriented obliquely to the linearly polarised electromagnetic waves propagated from the antenna so as to convert the electromagnetic waves to or towards circular polarisation.

The polariser including the vanes maybe comprised from a dielectric material e.g. plastic and/or ceramic manufactured using a 3D additive manufacture process. The vanes may be oriented at substantially 45 degrees to the linearly polarised electromagnetic wave propagated from the antenna so as to circularly polarise the electromagnetic wave. It will be appreciated that the vanes can be orientated at substantially 45 degrees to provide right hand circular polarisation or 45 degrees in the opposite direction to provide left hand circular polarisation.

The width of each vane may vary with distance from the aperture. In this way the polariser can be used to shape the beam from the antenna. In one arrangement the vanes may be tapered so as to broaden as they extend away from the antenna. This enables the beam to be broadened. Alternatively the vanes may be tapered to narrow as they extend away from the antenna.

The ends of the vanes distal to the antenna may lie on an imaginary surface that is curved. This can be used to provide lens correction, e.g. for use with minimum size higher gain antenna. Depending on the lens correction required, the imaginary surface may be convexly curved; it may be double convexly curved. The end face or edge of the vanes may be curved such that the ends of the vane lie on the curved imaginary surface.

The polariser may comprise a first set of vanes and a second set of vanes, each vane of the first set having a first shape, and each vane of the second set having a second shape, the shapes being different in order that the first and second sets polarise different frequency bands. In one arrangement the vanes of the first set may be longer than the vanes of the second set so as to polarise a lower frequency band.

The polariser may be comprised from a single integral piece, e.g. of dielectric material, e.g. plastics material, that, at least in part, defines the vanes of the antenna. The single integral piece may be manufactured using a 3D printing (additive manufacture) process. The single integral piece may define a radome of the polariser.

The use of a 3D printing process means the prior art eight piece meander line polariser can be replaced with a single integral piece polariser.

The polariser may comprise one or more metallised surfaces that provide a radiating surface of an antenna. The polariser may comprise at least two metallised surfaces that are isolated from one another to provide multiple radiating surfaces of an antenna.

The polariser described above may be mounted across a physical aperture of an antenna horn.

In another aspect there is provided a polariser for a bicone antenna, the polariser, when in use, arranged to extend circumferentially around the bicone antenna and comprise vanes that extend radially away from the bicone antenna, the vanes oriented obliquely to the linearly polarised waves propagated from the antenna so as to convert the waves to or towards or circular polarisation.

The vanes are typically circumferentially spaced around the bicone antenna. The vanes are also favourably equally spaced around the bicone antenna. The vanes may be oriented at substantially 45 degrees to the linearly polarised electromagnetic wave propagated from the antenna so as to circularly polarise the electromagnetic wave. It will be appreciated that depending on which direction the vanes are orientated from the linearly polarised waves, the polariser will provide right hand circular polarisation or left hand circular polarisation.

The width of each vane may vary with distance from the aperture. In this way the polariser can be used to shape the beam from the antenna. In one arrangement the vanes may be tapered so as to broaden as they extend radially away from the antenna, favourably such that the radially distance ends are wider than the antenna aperture. This enables broadening of the propagated beam from the antenna.

The ends of the vanes distal to the antenna may lie on an imaginary curved surface. This can be used to provide lens correction, e.g. for use with a minimum size higher gain antenna. Depending on the lens correction required, the imaginary surface may be convexly curved; it may be double convexly curved.

The thickness of the vanes may vary with radial distance from the antenna. This can be used for matching the impedance of the polariser to the surround medium (e.g. air). It can also be used to control the length of the vanes and thus overall size of the polariser whilst maintaining its effectiveness with one or more specific frequency bands. The thickness of the vanes may vary non-linearly with radial distance from the antenna's physical aperture. In one arrangement the ends of the vanes may be narrowed to provide impedance matching.

The polariser may comprise a central hub; the vanes may extend radially outwards away from the hub. The hub may be arranged to physically and electrically isolate a first and second (e.g. top and a bottom) radiating surfaces (favourably conical surfaces) of the bicone antenna. The hub may act to support the radiating surfaces. The radiating surface may be provided by metal cones of the bicone antenna.

The polariser may be comprised from a dielectric material, e.g. plastic or ceramic. The polariser may comprise a metallised surface (e.g. a metallised conical surface) that provides a radiating surface of the antenna. Favourably the polariser provides two separated metallised surfaces that provide separate radiating surfaces of the antenna. In this way the antenna and polariser can be integrated, removing the need to provide separate metallic cone elements. The central hub of the polariser may define the metallised surface(s).

The polariser may be for any one or more of a HJ and K band antenna, In one arrangement it may be for a K band antenna. The polariser may have a maximum width (e.g. diameter) equal or less than 55 mm. The polariser may be comprised from a material having a relative dielectric constant of at least 3.5.

The polariser may comprise a first set of vanes and a second set of vanes, each vane of the first set having a first shape, and each vane of the second set having a second shape, the shapes being different in order that the first and second sets polarise different frequency bands. In one arrangement the vanes of the first set may be longer than the vanes of the second set so as to (optionally circularly) polarise a lower frequency band. The vanes of the first and second sets may be interleaved.

The polariser may be comprised from a single integral piece, e.g. of plastics and/or ceramic material, that at least in part, defines the vanes of the polariser. The single integral piece may be manufactured using a 3D printing (additive manufacture) process. The single integral piece may define a radome of the polariser.

In another aspect there is provided a combined polariser and antenna manufactured from a plastics material via a 3D printing process, the polariser having one or more metallised surfaces to provide the antenna.

In one form of the invention the plastic of the polariser may be directly metallised to eliminate the bicone piece parts. This may further reduce costs.

According to a further aspect there is provided a method of manufacture of an antenna comprising a polariser comprising the steps of forming a polariser from plastics material via 3D printing; and directly metallising the plastics material of the polariser. The antenna may be a bicone antenna; further the antenna may comprise four feeds.

In another aspect there is provided a four-feed bicone antenna. The bicone antenna may comprise more than four feeds. The feeds are favourably arranged symmetrically about the centre of the radiating surface of the antenna. The radiating surface may comprise a circumferential apex, e.g. through a ridge that is circumjacent a central depression of the radiating surface. The feeds are favourably arranged on circumferential apex. The four feeds may be provided by four coaxial cables. Each of the four feeds may be driven by a separate amplifier, e.g. a solid state amplifier.

The invention will now be described with reference to the accompanying diagrammatic drawings in which:

FIGS. 11A-11C are perspective views a bicone antenna having four feeds.

A standard bicone can be thought of as a uniformly tapered transmission line with characteristic impedance a function of the cone angle. The bicone is fed across the apex gap with a coaxial input (e.g. 50Ω) producing currents flowing towards the cone rim (directrix) with magnetic fields oriented orthogonally as circular conic sections. This generates a dominant mode TEM (plane wave) field structure yielding linear polarisation oriented along the cone axis. Because of the circular symmetry of the feed input, the top and bottom cones act as a balun for the unbalanced coaxial feeds.

The cone matches the input impedance to free-space (120π Ω) at the cone radiating aperture. The bicone impedance is a function of bicone angle and dielectric properties of the medium between the cones. Impedance matching is achieved by varying the cone angle radially, for example, producing a Klopfenstein taper which produces the best match for a given taper length.

The bicone is linearly polarised and so requires a polariser to generate the specified circular polarisation. The novel dielectric turbine polariser, described below, produces elliptical right or left hand polarisation at a fraction of the cost using the latest 3D printing additive manufacturing processes.

To increase robustness a further form of antenna is shown in the Figures, for example an integral radome is also shown in some of the appended Figures.

The polariser may be, for example, manufactured by selective laser sintering of Duraform GF, a plastic matrix of polyamide (nylon) and glass fibre with dielectric constant of $\varepsilon=3.7$.

The antenna shown in the Figures is planned as a higher frequency (K Band) antenna but the example is exemplary only.

It will be appreciated to one skilled in the art that some of the key innovations here are:

a. new type of polariser, named in this application as a "turbine polariser", which may be manufactured entirely from plastic. Furthermore, the polariser converts the default horizontal linear polarisation of the design to the operationally required right hand circular and vertical linear polarisations;

b. a low cost substitute for printed (meanderline) polariser, the turbine polariser being quick to model using electromagnetic simulation tools (e.g. CST) since it is just one material. Meanderline polarisers have layers of intricate plated tracks which typically take much longer to simulate;

c. The turbine polariser is a single part whereas a broadband meanderline polariser has typically seven piece parts which are glued together increasing assembly time and cost, plus the layers need accurate alignment;

d. 60% of the antenna cost is due to the polariser. The turbine polariser would reduce this significantly;

e. an integral radome may be designed to protect the polariser during flight;

f. the use of the latest additive manufacturing techniques, enabling quick manufacture by 3D printing; thereby reducing the overall cost and particularly the assembly costs (unlike the standard meanderline polariser with a number of printed grids).

The turbine polariser may only be made using 3D printing (additive manufacturing) techniques which enables design limited manufacturing rather than manufacturing limited design.

DETAILED DESCRIPTION OF ONE SPECIFIC EMBODIMENT OF THE INVENTION

As shown in the FIG. 4-7B, the bicone antenna includes a 3D printed integral polariser. The antenna consists of 4 piece parts: a top brass bicone, bottom brass bicone, turbine polariser and coaxial cable. The polariser is comprised from plastics material. However, it will be appreciated that other materials may be used.

Figure 7A:
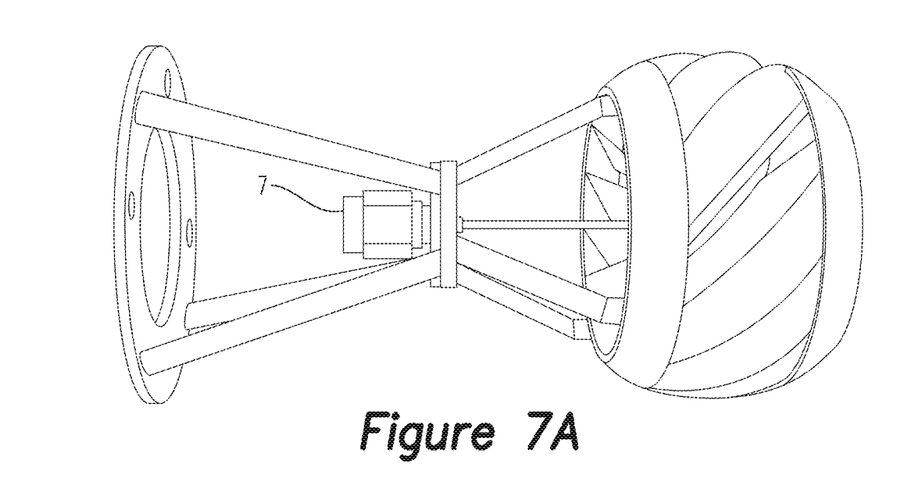
FIGS. 7A-7B show antenna piece parts in accordance with one form of the invention.
Figure 7B:
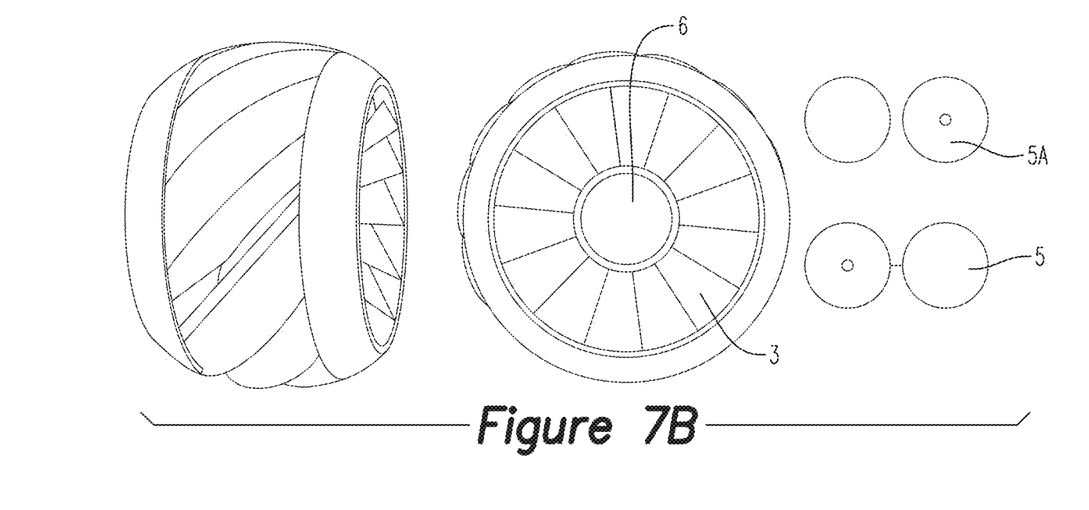

In FIGS. 7A and 7B two of each of the top and bottom bicones are shown to illustrate their top and bottom surfaces. FIGS. 7A and 7B also show two polarisers one viewed side on and the other axially, and an assembled K band antenna that incorporates a polariser with integrated jig.

The polariser operates by placing circularly symmetric dielectric vanes at 45° to the original bicone H polarisation producing a phase lag between its two orthogonal components. The design is computer optimised to achieve a phase lag of 90° which yields a right hand circular polarisation signal (or left hand for the vanes at −45°).

As the polarisation depends on the 90° phase shift, the maximum bandwidth for the basic design is about 60%, for axial ratio <3 dB (a measure of polarisation fidelity). K band is 33%. It may be possible to broaden the bandwidth by, for example, interleaving the vanes with ones optimised at a different frequency. The advantage of 3D printing is that all variations are easily manufacturable with the computer simulated design digitally downloaded straight to the 3D printer. The dielectric properties of the material, the dielectric constant $\varepsilon$ and loss tangent tan $\delta$ are required to be known.

Typically, not much information on dielectric properties of 3D printed materials is currently available (manufacturers concentrate on mechanical and thermal properties) however, P. I. Deffenbaugh, R. C. Rumpf, K H. Church, *Broadband Microwave Frequency Characterization of Printed Materials,* 2013 which has measurements of $\varepsilon$ and tan $\delta$ for some printed materials up to 11 GHz.

From this information, two materials were chosen based on the computed performance from dielectric constant modelling using 3D electromagnetic software. Simulation suggested $\varepsilon$~3.5 to 4.5. Ideally low loss (tan $\delta$<0.01).

Two materials selected were:

a. Samos NanoTool (or a similar material called Perform), a resin filled with ceramic nanospheres. This material uses liquid photopolymer resin and is cured by an ultraviolet laser; and b. PA3200GF a glass sphere filled nylon 12, for example manufactured by Selective Laser Sintering (SLS) using thermoplastic powder where the laser fuses particles together layer by layer.

Further modelling was then used to extrapolate the measured $\varepsilon$ and tan $\delta$ to K band. The manufacturing process required keeping the walls thicker than 0.5 mm. Models were produced with 0.1 mm and 5° resolution which gave a file size of 5 MB for each model which was uploaded online. Two models were manufactured, both of the same design but one with an integral test jig for ease of measurement in the antenna anechoic chamber.

It will be appreciated that the dielectric properties may be measured rather than modelled for printed materials up to 40 GHz thereby increasing the database significantly in the area of rapid prototyping for antennas.

The invention as described above provides a small, low-cost, broadband (up to 3:1) and robust antenna used to spatially combine the power input into the four feeds of the bicone for RF transmission. The addition of the integral dielectric turbine polariser transforms the transmitted power into elliptical right or left hand polarisation with the degree of polarisation computer optimisable depending on bandwidth, bicone dimensions and choice of polariser material.

1) The invention antenna and polariser are broadband (up to 300% depending on size—the prior art waveguide bicone is <50%).

2) It can transmit higher powers from solid state amplifiers. Due to technology limitations, the RF power available from each amplifier is limited and so by using an antenna with four feeds each with its own amplifier enables the transmission of higher RF power.

3) The invention uses broadband, small, coaxial transmission lines. The antenna is small, compact and robust (withstanding high launch g) enabling it to fit into existing aircraft dispensers for use in ECM applications.

The dielectric turbine polariser is capable of being manufactured using the latest 3D Additive Manufacturing processes of Stereolithography and Selective Laser Sintering.

It will be appreciated that the polariser is preferably formed from plastics material however, the polariser may be formed from ceramic material.

The ceramic version, which operates better at the lower part of the band for given small bicone dimensions, can be injection moulded or use the emerging ceramic stereolithography technology. Additive manufacturing produces parts rapidly and at a tenth the cost of the meanderline polariser and with no assembly required and with reasonable performance for this application. It will be appreciated that any other suitable form of manufacturing method may be used.

The present invention may be used in applications that require an RF system to have a change of polarization, currently for high frequency K Band applications. However, the present invention may be adapted to replace the current meanderline polarisers in the lower HJ Band antenna.

It will be appreciated that 3D printing of the present invention is advantageous in the field of microwave antenna as such antenna as described may be prototyped quickly at relatively low cost and make use of parts that could not normally be manufactured in any other way. Additionally, 3D printing enables metallisation of printed plastics and this is particularly useful in the present invention and is particularly useful in antenna design.

Figure 2:
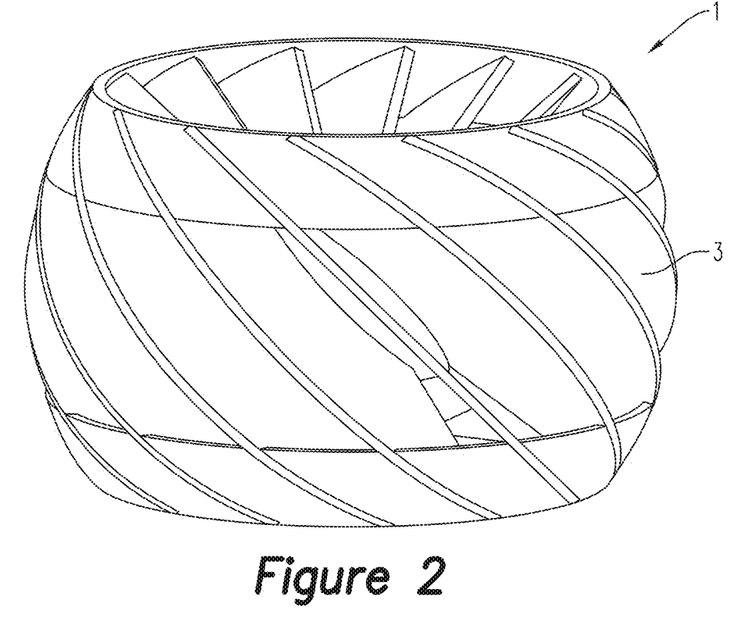
FIG. 2 shows a schematic view of a computer model of a single piece part plastic polariser in accordance with one form of the invention, the polariser forming part of an antenna.
Figure 3:
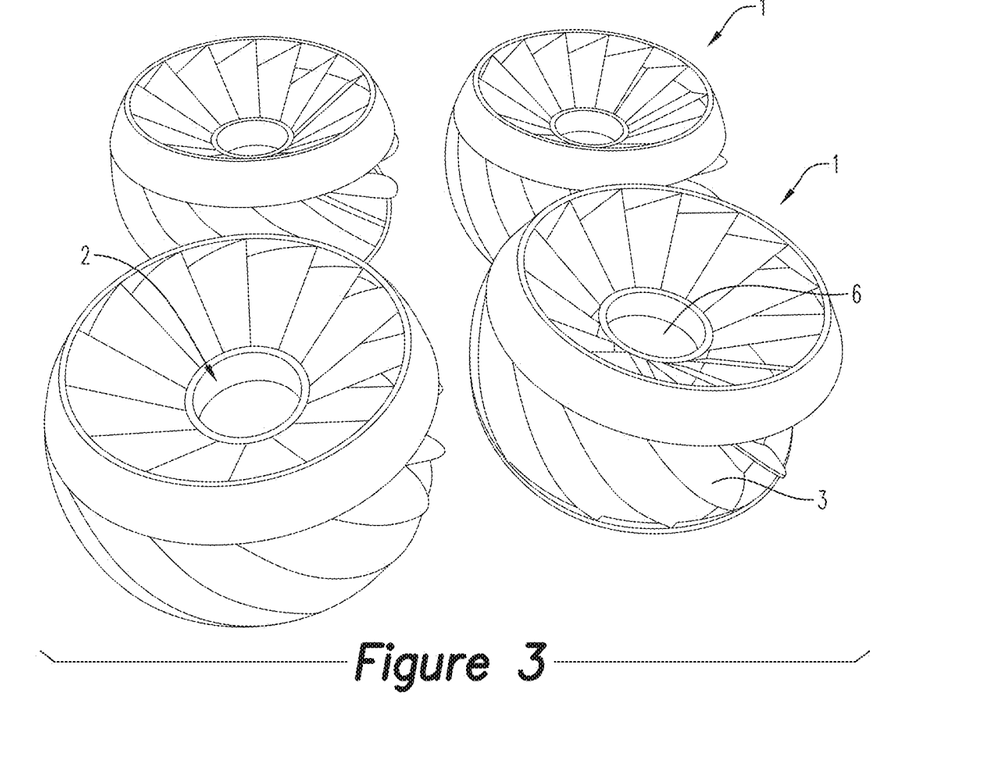
FIG. 3 shows manufactured 3D printed turbine polarisers, in accordance with one form of the invention, showing each as a single printed piece part.
Figure 4:
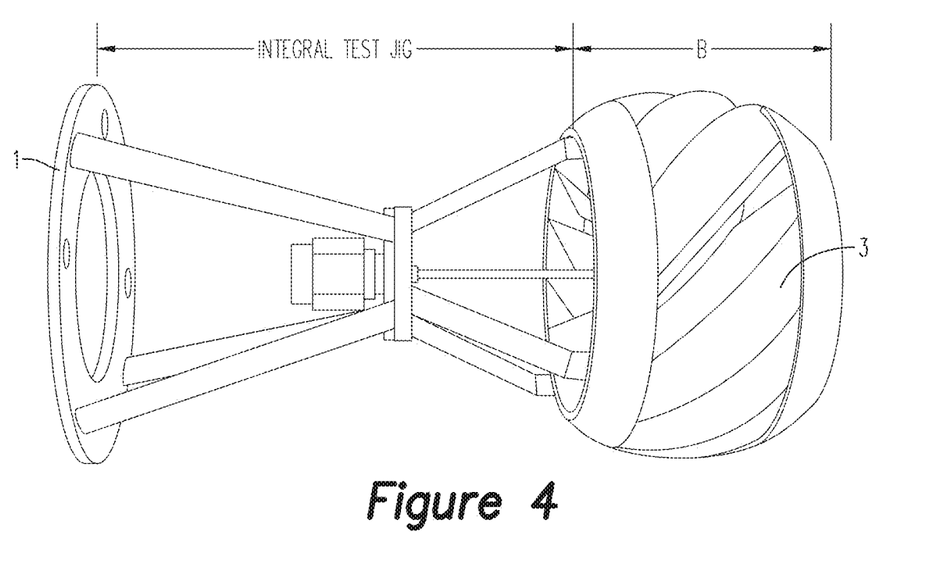
FIG. 4 shows one form of assembled K Band antenna with integral jig.
Figure 5A:
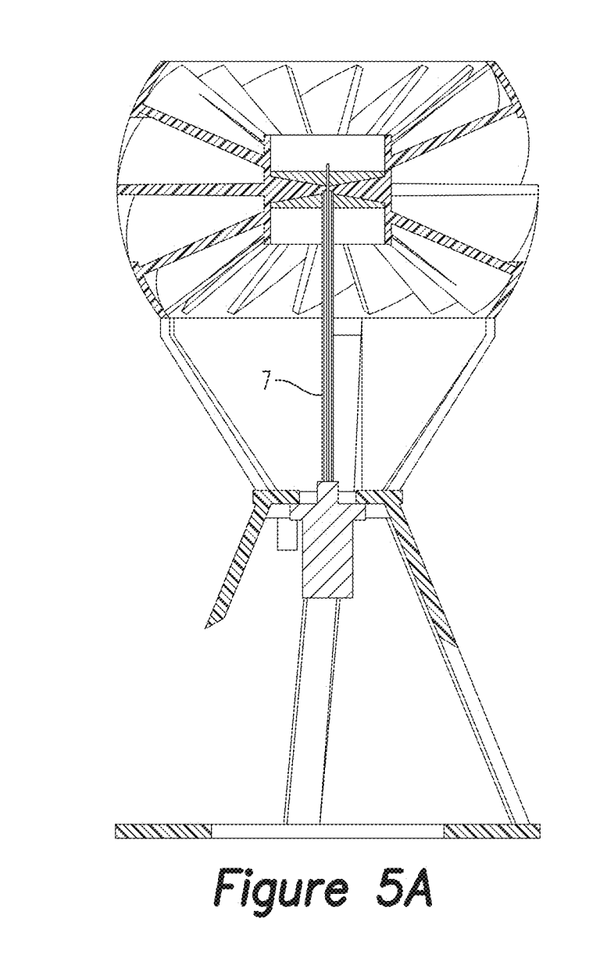
FIGS. 5A-5C show a schematic sectional view of a computer model of one form of the K band antenna comprising a turbine polariser.
Figure 5B:
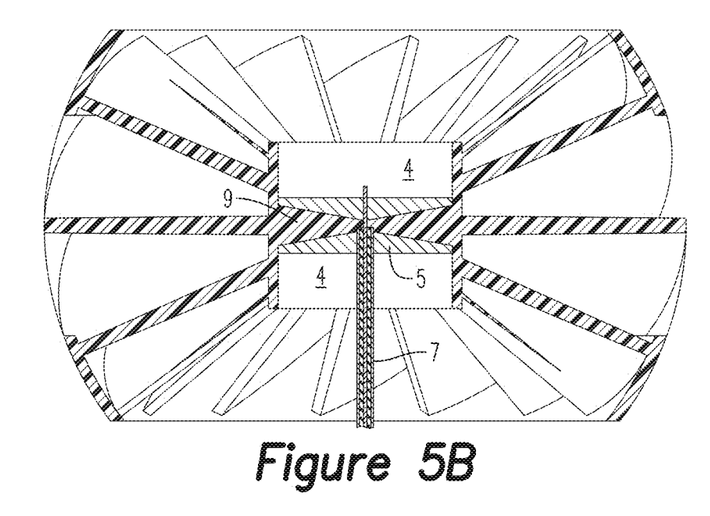
Figure 5C:
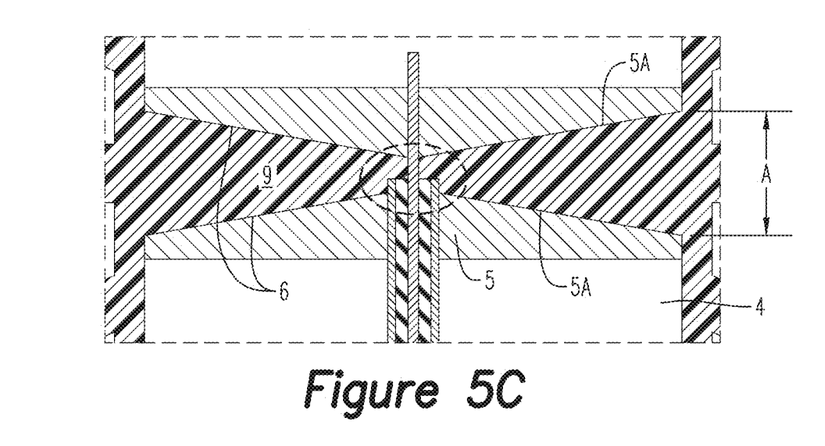
Figure 6:
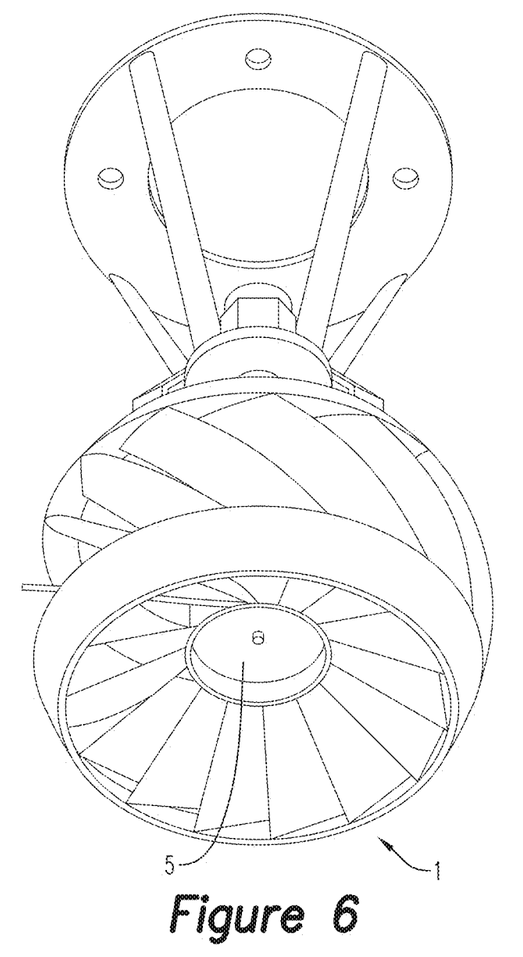
FIG. 6 shows an alternative view of one form of the assembled K Band antenna in accordance with one form of the invention.

FIGS. 2 and 3 illustrate an example circular polariser for a K band bicone antenna 1. FIGS. 4, 5A-5C, 6 and 7A-7B show a bicone antenna incorporating the polariser of FIGS. 2 and 3.

The antenna and polariser illustrated in FIGS. 4, 5A-5C, 6 and 7A-7B was formed with an integrated jig in order to facilitate testing. The jig is optional and is not expected to be formed for polariser intended for practical employment.

The polariser is comprised from a single integral piece of dielectric material (e.g. glass filled nylon) manufactured using a 3D printing process. The polariser 1 comprises a central hub 2 (seen most clearly in FIGS. 3 and 5) and radial vanes 3 that are circumferentially spaced equally around the hub 2.

The hub 2 defines two recesses 4 each for receiving a cone piece 5 of a bicone antenna. Each recess 4 has a conical end face 6 against which a conical face 5A of the respective cone piece 5 lies flush (see FIG. 4). The recesses 4 are aligned such that the conical faces 5A of the cone pieces 5 face one another and are spaced apart (see FIGS. 5A-5C).

Figure 11A:
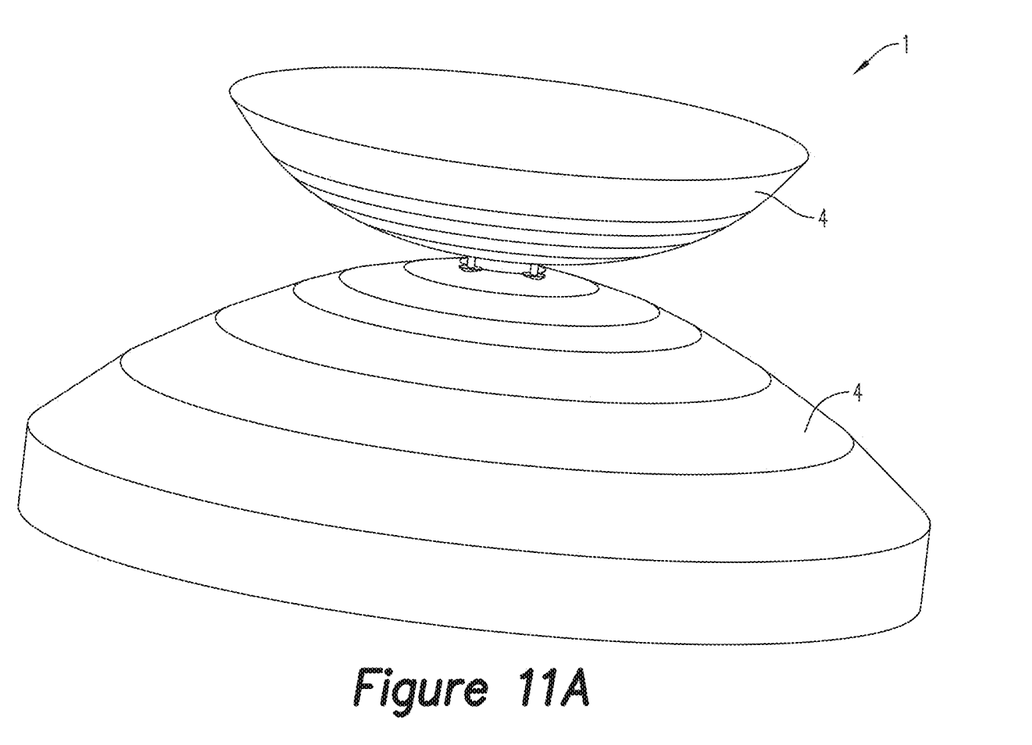
Figure 11B:
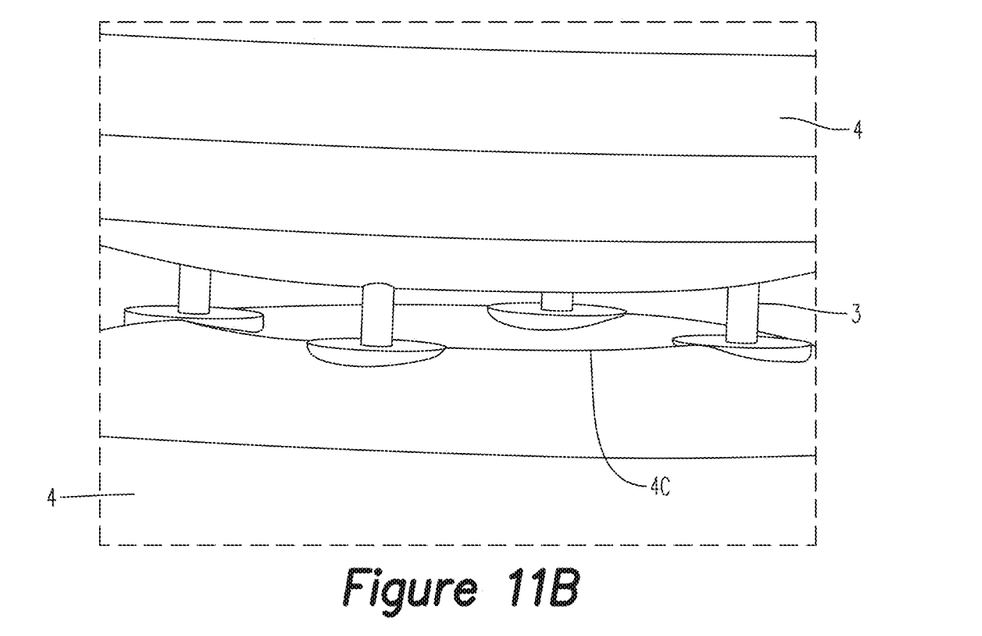
Figure 11C:
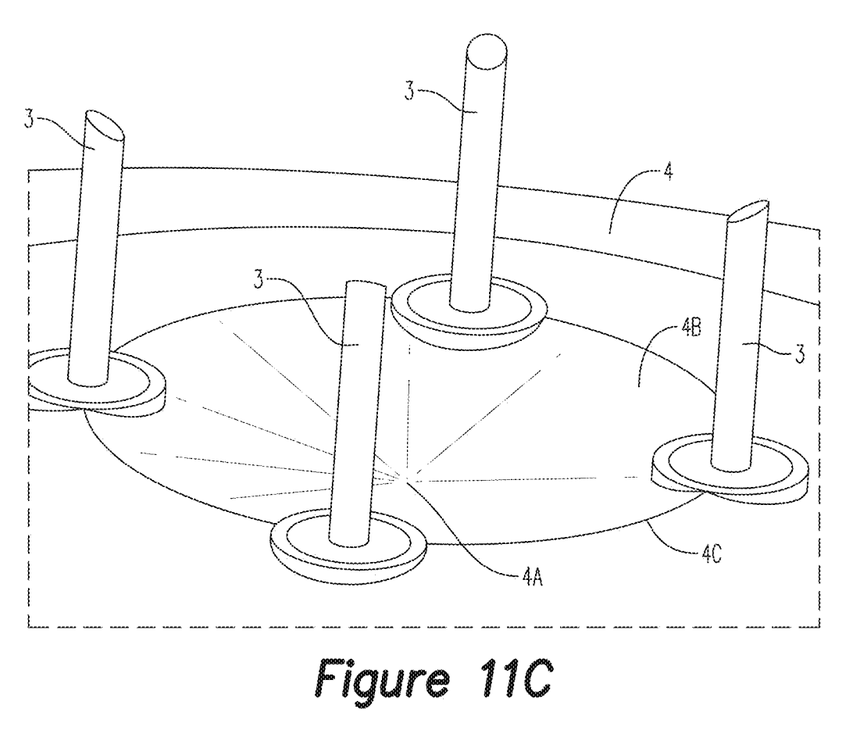
FIG. 11C shows the antenna absent the upper cone.

A co-axial cable 7 provides a single feed for the antenna. The cable extends 7 at least partially through the hub across the space between the two cone pieces. In an alternative arrangement four or more feeds as illustrated in FIGS. 11A-11C may be used.

The gap (volume of space) 9 directly between the conical end faces 5A of the cone pieces 5 may be completely filled with the dielectric material of the polariser 1 or optionally may be formed with cavities in order to vary the relative dielectric constant of the volume directly between the cones from that of the dielectric material. The relative dielectric constant of the gap 9 will depend on the proportion of the gap volume's that is occupied by cavity and what fills the cavity, e.g. air and/or another dielectric material. The total volume of the gap 9 that is occupied by a cavity or cavities may be selected based on the dielectric constant required to provide impedance matching of the antenna with that of the co-axial cable feed.

The vanes 3, which are of substantially identical shape, are equally spaced around the hub 2. Each vane 3 is angled at 45° to the linearly polarised waves from the bicone antenna aperture so as to produce a phase lag between the wave's two orthogonal components. The design of the vanes, e.g. thickness and length, is computer optimized based on the intended frequency band of the antenna, to bring about a phase lag of 90° which yields a right hand circular polarised wave. The vanes may instead be oriented at 45° to the linearly polarised waves in the opposite direction so as to yield left hand polarised wave.

The vanes 3 broaden with increased radial distance from the hub 2 such that the ends of the vanes that are radially distal from the hub 2 are broader than the separation between the outer edge of the two conical surfaces and thus of the height of the antenna aperture. This is evident in the figures, from the smaller axial separation A between the the conical surfaces of the cones compared with the axial separation B between the axial edges of the vanes 3.

The vanes 3 may be shaped so that their thickness varies with radial distance from the hub 2. In one arrangement, the thickness of the vanes tapered so as to narrow to their free ends. This design provides better impedance matching of the antenna with the surrounding medium.

The radially outward end face or edge or each vane is concavely curved between its upper and lower edges (as viewed in FIG. 2) such that they lie on a convexly curved (as viewed from outside of the polariser) imaginary surface that, by virtue of extending circumferentially around the polariser, has double convex curvature.

In an alternative arrangement of antenna (not shown), rather than using cone pieces, the two conical faces 6 of the hub 2 are metallised using conventional techniques (e.g. vapour deposition) to provide the radiating surfaces of the bicone antenna. As this arrangement does not require separate cone pieces 5, the hub 2 may not define the recesses 4.

In order to increase the bandwidth of the combined polariser and antenna, the polariser may be formed with a further set of vanes (not shown). The vanes of the second set are also equally spaced circumferentially around the hub and radiate from it. The vanes of the first and second sets are interleaved such that each vane of the second set has a vane from the first set immediately adjacent it on either side. The vanes of the second set are longer that than vanes of the first set in order to more readily circularly polarise waves of a lower bandwidth from the antenna.

Figure 8:
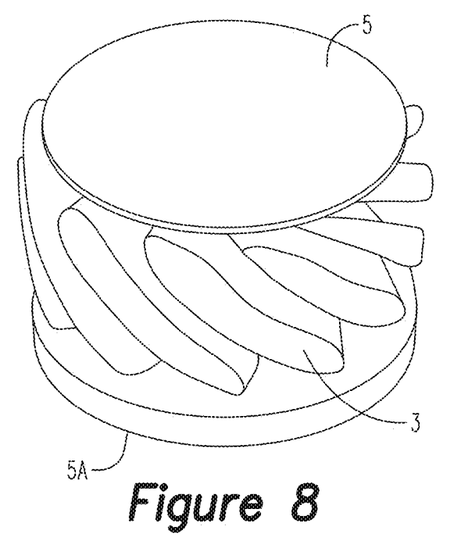
FIG. 8 shows a glass filled nylon polariser in accordance with a further form of the invention.

FIG. 8 illustrates an alternative bicone antenna with polariser adapted for use with a H and/or J band frequency bicone antenna. The vanes have a substantially constant width about their radial length. The cones of the antenna are seated about a conical face of the recess provided by the circumferentially spaced vanes. The cones are proportionally larger compared with the vanes such that the vanes lie substantially entirely between the cone pieces. In this instance the polariser, formed as a single integral piece using a 3D printing process, is manufactured from glass filled nylon though other materials may be used.

Figure 9:
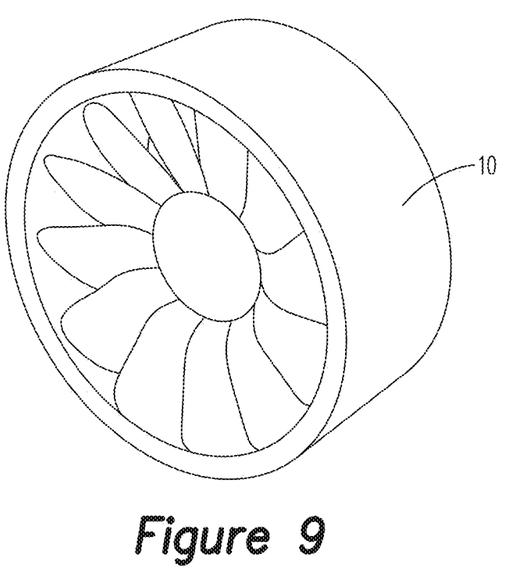
FIG. 9 shows a glass filled nylon turbine polariser with integral radome.

FIG. 9 is a further embodiment of polariser, similar to that of FIGS. 2-5C comprising an integral radome 10. The radome 10 is arranged radially outwards of the vanes and extends circumferentially around the vanes. The incorporation of a radome may increase the mechanical strength of the polariser. It will be appreciated that the radome's shape may vary from that shown in FIG. 9, e.g. so as to extend towards and optically over the axis of the polariser so as to cover the cones 5 of the antenna.

It will be appreciated that the antenna may find use in applications that require meanderline polarisers. These may include but not be limited to omni-directional antennas, direction finding antennas and horn antennas.

It will further be appreciated that the polariser may be developed further to obtain a flat profile. Furthermore, it the polariser may be developed further to provide dual-use of radiation pattern tapering as well as polarisation change.

The invention may also find use in any antenna needing a cylindrical polariser for example, direction finding and omni antennas.

There is also the possibility of replacing a flat meanderline polariser in front of the horn by using a flat version of the polariser. Furthermore, the dielectric polariser may be shaped as well to provide a dual-use a lens corrected horn as well.

Figure 10A:
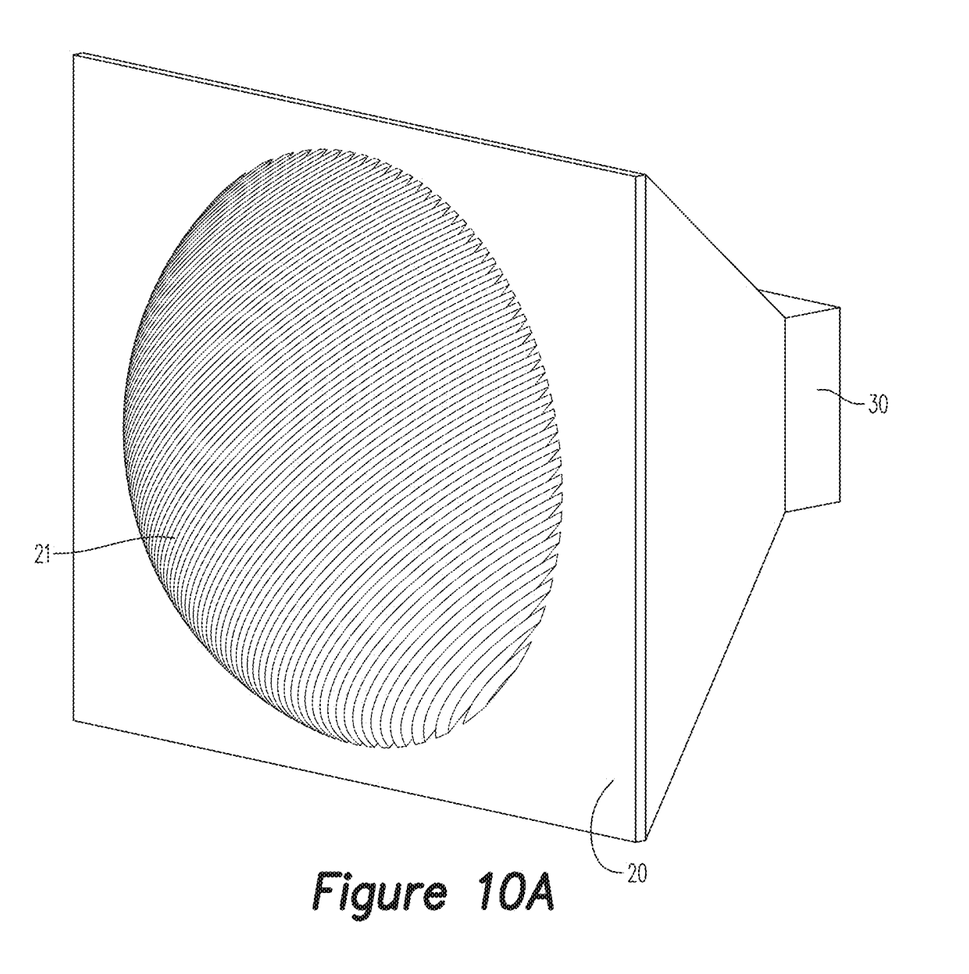
FIGS. 10A-10C are perspective, side and end on views of a feed horn with a dielectric circular polariser that provides lens correction.
Figure 10B:
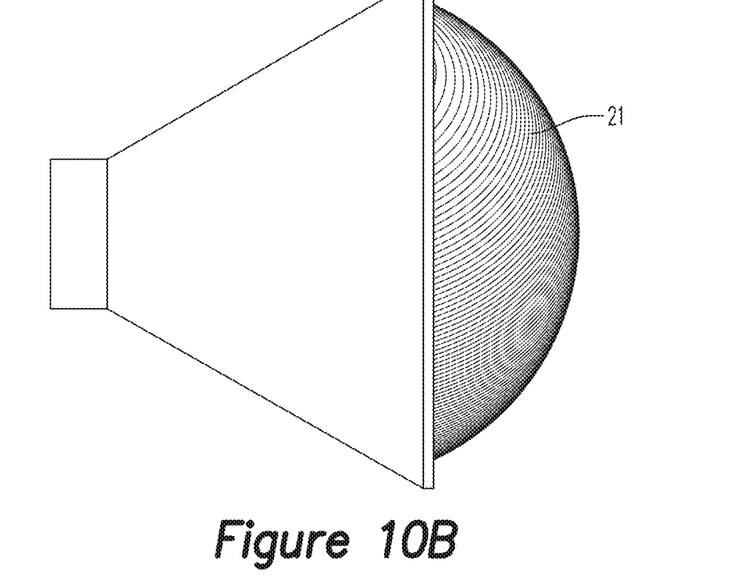
Figure 10C:
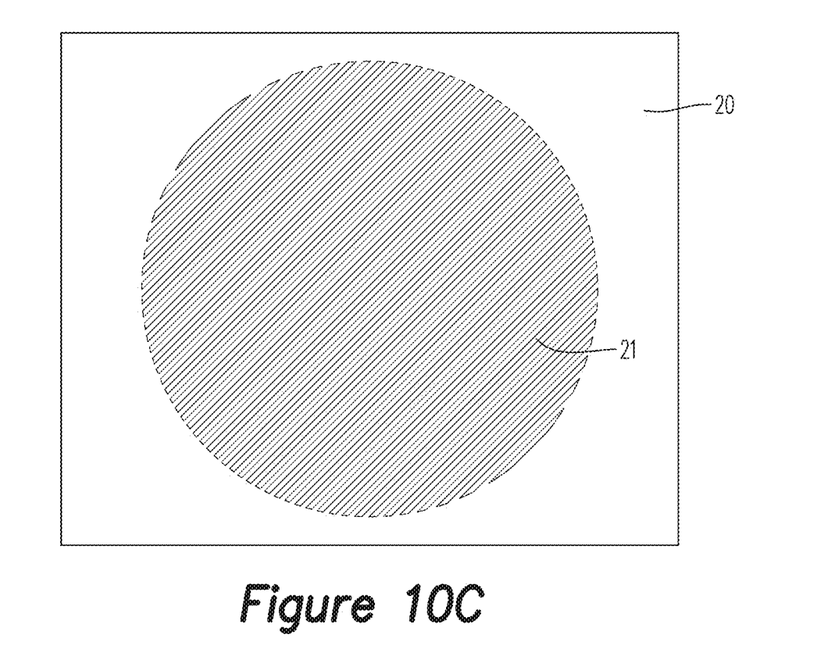

An example of a polariser 20 for a horn antenna is illustrated in FIGS. 10A-10C. The dielectric polariser 20 is manufactured from a single integral piece of dielectric material using a 3D printing (additive manufacture) process. The polariser 20 is mounted over the aperture of a horn antenna 30. The polariser 20 comprises a plurality of parallel dielectric vanes 21 that extend away from the aperture. Each vane 21 is oriented to lie at 45 degrees to the linearly polarised waves propagated from the horn 30 such that the resulting wave from the polariser following interacting with the vanes 21 has circular polarization (either left or right handed).

As seen most clearly in FIGS. 10A and 10B, the edges of vanes radially distal from the horn 30 are shaped so as to lie on an imaginary surface that has double convex curvature (as viewed facing towards the horn). This curvature provides a lens correcting function. It will be appreciated that the vanes could instead be shaped such that the imaginary plane has a single convex curvature only.

The choice of material used to form the polariser is made based on its relative dielectric constant given the relatively limited (at present) number of materials available for additive manufacture. Materials that have a higher relative dielectric constant may in certain applications be preferred as they allow use of shorter vanes and thus a smaller polariser.

FIGS. 11A-11C illustrate an alternative bicone antenna having four coaxial feed inputs 3 instead of one. Apart from being arranged away from the centre of the radiating surface, each of the four feeds physically connects to the two radiating surfaces in the same way as in a traditional single feed bicone antenna.

The feeds 3 are arranged circumferentially and symmetrically about the centre 4A of each conical radiating surface of cone 4.

Each feed 3 is driven by a separate solid state amplifier (not shown) from a signal source, e.g. RF transmitter.

The four radiated beams from the antenna are combined spatially to reduce the RF loss.

The bicone is 50 mm diameter but this is exemplary only and other sizes of bicone may be envisaged. For this particular compact design the RF power input into the coaxes are from solid-state MMIC amplifiers on a PCB attached to the base of the bicone.

It will be appreciated that other larger numbers of feeds 3 may be envisaged for other applications. The reason for four feeds is because many applications require maximum power transmission from the solid-state amplifiers currently available. Solid-state amplifiers are necessarily used because of the small space envelope available in such antenna. In one arrangement the bicone transfers the four blocks of input power from the four amplifiers and adds them with low-loss (a high antenna efficiency) during transmission from the antenna. To achieve a good simultaneous match (called the F-parameter) it is important to place the feeds symmetrically. Also to achieve the required omni-direction coverage the coaxial cables have to be placed near the centre of the bicone. The smallest bicone feed-point gap which is manufacturable is required to achieve the optimum simultaneous match.

As can be seen in FIG. 11C, each transmitting surface 4 of the bicone antenna defines central depressions 4B so as to define a circumferential ridge 4C that forms the apex of the radiating surface. The feeds 3 are spaced on the ridge 4C symmetrically about the centre 4A such that each feed lies partially in the depression. This arrangement provided good matching as each feed lies at the circumferential apex of the radiating surface. The radiating surfaces may be provided either by conventional cone pieces or through a metallised surface of the hub of a polariser as described above.

The estimated the power handling of the 50 mm diameter version of the bicone is a peak power of ~1 KW at sea level and 30 W average power.

The design is tolerant to feed amplitude and phase imbalances of ~±1 dB and ±10°.

There is graceful degradation of performance such that if a single feed breaks 75% of the power will still be transmitted.

The invention claimed is:

1. A polariser for a bicone antenna, the polariser configured to extend circumferentially around the bicone antenna; and
vanes arranged to extend radially away from the bicone antenna, the vanes being oriented obliquely to a linearly polarized electrical field when propagated from the bicone antenna so as to convert the electromagnetic waves to or towards circular polarization; wherein the polarizer comprises a hub about which the vanes are supported, the hub arranged to support a first and second cones of the bicone antenna, and physically and electrically isolate a first and second radiating surfaces of the bicone antenna; and wherein the polarizer is a single integral piece that defines, at least in part, the vanes and the hub.

2. A polarizer according to claim 1, wherein radially outward facing ends of the vanes lie on an imaginary curved surface.

3. A polarizer according to claim 2, wherein the radially outward facing ends of the vanes lie on an imaginary convexly curved surface.

4. A polarizer according to claim 3, wherein the imaginary convexly curved surface has a double convex curvature.

5. A polarizer according to claim 1, in which a thickness of the vanes varies with radial distance from the aperture.

6. A polarizer according to claim 1, comprising:
a first set of vanes and a second set of vanes, the vanes of the first set having a different shape to the vanes of the second set in order that the first and second sets of vanes polarize different frequency bands.

7. A polarizer according to claim 1, comprising:
a metallized surface that provides a radiating surface of a bicone antenna.

8. A polarizer according to claim 1, wherein the hub comprises:
a metallized surface that provides a radiating surface of a bicone antenna.

9. A polarizer according to claim 1, wherein the single integral piece also defines, at least in part, a radome.

10. An antenna comprising:
a polarizer; and
the polarizer being formed of a single integral piece of 3D printable plastics material, the plastics material having one or more metallized surfaces that provide one or more radiating elements of the antenna.

11. A method of manufacture of an antenna having a polarizer, the method comprising:
forming a polarizer from plastics material via a 3D printing process; and
directly metallizing the plastics material of the polarizer to provide one or more radiating elements of the antenna.

12. A method of manufacture according claim 11, comprising:
providing one or more cavities between metallized surfaces that provide radiating surfaces of the antenna in order to impedance match the antenna with a transmission line that feeds the antenna.

13. A bicone antenna comprising:
two radiating surfaces; and
four feedlines, each of the four feedlines being electrically connected to the two radiating surfaces.

14. A bicone antenna according to claim 13, wherein at least one of the radiating surfaces defines a circumferential apex that surrounds a center of the radiating surface, the feedlines being arranged on the circumferential apex.

15. A bicone antenna according to claim 14, wherein at least one of the radiating surfaces defines a circumferential ridge that defines the circumferential apex, the ridge lying between a central depression and an outer portion of the radiating surface, the four feeds being arranged about the ridge.

16. A bicone antenna according to claim 15, wherein each of the four feedlines lie partially within the depression.

17. A bicone antenna according to claim 13, wherein at least one of the radiating surfaces defines a central depression, and the four feedlines are arranged around the central depression.

* * * * *